(12) United States Patent
Masson

(10) Patent No.: US 10,220,381 B2
(45) Date of Patent: Mar. 5, 2019

(54) APPARATUS FOR COATING A SUBSTRATE

(71) Applicant: UMICORE AG & CO. KG, Hanau-Wolfgang (DE)

(72) Inventor: Stéphane Masson, Village Neuf (FR)

(73) Assignee: UMICORE AG & CO KG., Hanau-Wolfgang (DE)

( * ) Notice: Subject to any disclaimer, the term of this patent is extended or adjusted under 35 U.S.C. 154(b) by 0 days.

(21) Appl. No.: 15/317,308

(22) PCT Filed: Jun. 9, 2015

(86) PCT No.: PCT/EP2015/062767
§ 371 (c)(1),
(2) Date: Dec. 8, 2016

(87) PCT Pub. No.: WO2015/189171
PCT Pub. Date: Dec. 17, 2015

(65) Prior Publication Data
US 2017/0128928 A1    May 11, 2017

(30) Foreign Application Priority Data
Jun. 11, 2014   (EP) .................................... 14171938

(51) Int. Cl.
*B01J 37/02*   (2006.01)
*B01J 35/04*   (2006.01)
(Continued)

(52) U.S. Cl.
CPC ........... *B01J 37/0215* (2013.01); *B01J 35/04* (2013.01); *B05C 7/04* (2013.01); *B05C 21/00* (2013.01); *F01N 3/035* (2013.01); *F01N 3/28* (2013.01); *F01N 3/2803* (2013.01); *G01F 23/261* (2013.01); *F01N 2510/06* (2013.01)

(58) Field of Classification Search
None
See application file for complete search history.

(56) References Cited

U.S. PATENT DOCUMENTS

| 4,329,162 A | 5/1982 | Pitcher, Jr. |
| 2006/0208004 A1 | 9/2006 | Feather |

(Continued)

FOREIGN PATENT DOCUMENTS

| CN | 203764476 A1 | 8/2014 |
| DE | 102010008700 A1 | 8/2011 |
| DE | 102010007499 A1 | 9/2015 |

OTHER PUBLICATIONS

Written Opinion of the International Searching Authority dated Dec. 17, 2015 for PCT/EP2015/062767 (5 pages).

(Continued)

*Primary Examiner* — Jethro M. Pence
(74) *Attorney, Agent, or Firm* — Smith, Gambrell & Russell, LLP

(57) ABSTRACT

The present inventions is concerned with an apparatus and a method of improving the accuracy of coating a ceramic or metallic honeycomb body, which can usually be used as a catalyst in automotive exhaust mitigation. The invention achieves to directly test whether the coating slurry in the coating chamber is ready to be submitted to the monolith or needs to be replaced before coating the monolith.

14 Claims, 2 Drawing Sheets

(51) Int. Cl.
*B05C 21/00* (2006.01)
*B05C 7/04* (2006.01)
*F01N 3/035* (2006.01)
*F01N 3/28* (2006.01)
*G01F 23/26* (2006.01)

(56) References Cited

U.S. PATENT DOCUMENTS

| | | |
|---|---|---|
| 2012/0315381 A1 | 12/2012 | Mergner et al. |
| 2012/0321537 A1 | 12/2012 | Mergner et al. |
| 2013/0122196 A1* | 5/2013 | Clinton .................... B05D 7/22 427/244 |
| 2014/0191054 A1* | 7/2014 | Hingley ............... A61M 11/005 239/1 |

OTHER PUBLICATIONS

International Preliminary Report on Patentability dated Dec. 15, 2016 for PCT/EP2015/062767 (6 pages).

International Search Report for PCT/EP2015/062767, dated Sep. 3, 2015 in English Language.

http://en.wikipedia.org/wiki/Level_sensor (Level Sensor from Wikipedia, the free encyclopedia) referenced in the present EP priority application filed on Jun. 11, 2014.

http://www.vega.com/en/home_us/Products/Product-catalog/Switching/Vibration (Measuring methods for continuous level measurement) based on the reference made in the present EP priority application filed on Jun. 11, 2014.

\* cited by examiner

APPARATUS FOR COATING A SUBSTRATE

The present inventions is concerned with an apparatus and a method of improving the accuracy of coating a ceramic or metallic honeycomb body, which can usually be used as a catalyst in automotive exhaust mitigation. The invention achieves to directly test whether the coating slurry in the coating chamber is ready to be submitted to the monolith or needs to be replaced before coating the monolith.

Various problems arise during the coating of ceramic or metallic honeycomb bodies/filters, referred to below as substrates or monoliths, with liquid coating media (so called washcoat). One possibility for coating substrates is to bring the openings on one side thereof into contact with the coating medium made available from below or from above the monolith and to draw the liquid coating medium through the channels of the substrate by applying a vacuum to the opposite side of the substrate. If the intention is to coat the channels on only part of the length thereof, it is disadvantageous that different channels are coated over different lengths due to the inevitable flow profile which arises, when using these methodic approaches.

If the coating medium is forced into the channels by pressure against the force of gravity, there is then a need to check (generally by means of a sensor) when the liquid emerges at the top in the case of complete coating of the channels. In the case of coating over part of the length of the channels, the height of the liquid column of coating medium within the channels is usually determined by direct or indirect measurement through sensors (capacity sensor; visual sensor; IR-sensor; vibrational sensor). However, also in this case an inhomogeneous coating front within the channels of a monolith can result, e.g. if coating is started with an uneven slurry surface formed in the coating chamber below the monolith. The latter occurs, in particular, if fast coating speeds are applied and coating slurry tends to get turbulent while being pumped into the coating chamber within a short timeframe.

In DE102010007499A1 a preferred coating apparatus and method is disclosed where cylindrical support bodies, each having two end faces, a circumferential surface and an axial length L, further being traversed from the first end face to the second end face by a multiplicity of channels, are coated with a liquid coating media. The apparatus in question has a cylinder filled with a liquid and has a piston, wherein the liquid-filled cylinder communicates with a tank, in the interior of which a displacement body is arranged in such a way that, when the piston is moved, the displacement body is moved proportionally by the liquid. The tank communicates with the coating device for the substrate, thus the displacement body acts on the liquid coating medium, with the result that a proportional change in the level of liquid coating medium in the coating device is brought about (see FIG. 1 of that application). Two sensors are arranged on the same height in the coating device in order to check whether the position of the slurry surface in the coating chamber has reached a certain level.

It is obvious that a coating method is preferred in which the coating process can be made faster in order to coat as many parts a time as possible. This process of course should not diminish the accuracy of the coating; especially in the case of zone coating a monolith an accuracy of coating height has to be applied that allows to have the zone ends of the coating in the channels of the monolith within a threshold range of ±5 mm, better ±3 mm or even less.

If the coating speed is increased the filling of the coating chamber has to happen in less time. This leads to a more turbulent filling of the chamber, which might, subject to the character of the washcoat and the installed tools, lead to an uneven coating surface in the coating chamber or to the appearance of bubbles predominantly in the periphery of the coating slurry close to the chamber walls. If the coating process proceeds this would lead to an uneven coating front also within the channels of the monolith and, hence, would increase the risk that coated parts are off-specification.

The objective of the present invention therefore was to present an apparatus and its use for mitigating mentioned adverse effects when a coating of automotive catalysts is performed. In particular, the apparatus should be able to directly and easily distinguish between coating surfaces in the coating chamber, which are even relative to those, which are uneven or somehow odd or probably contain bubbles. The latter leads to false-coated parts if coating is continued.

These and other objectives being obvious for the skilled worker in view of the prior art are resolved by applying the apparatus according to present claim 1 in a method for coating a honeycomb monolith. Claim 6 is directed to the apparent use of this apparatus. Claims 2-5 encompass preferred aspects of the present invention either with regard to the apparatus of claim 1 or the its use covered by claim 6.

In that an apparatus is presented for coating substrates (121) for the production of exhaust gas purification catalysts, particularly for motor vehicles, which are cylindrical support bodies and each have two end faces, a circumferential surface and an axial length L and are traversed from the first end face to the second end face by a multiplicity of channels, with a liquid coating slurry (113);

said apparatus comprising:

a coating chamber (100) designed to receive said substrate (121) from the top and to attach said substrate in a liquid tight manner to the coating chamber (100) and further being able to receive said coating slurry (113) from below;

said coating chamber (100) further comprising a device (120) to check the height of said coating slurry within said coating chamber (100) by measuring a variable;

said device (120) having one sensor in a lower position (124) in the coating chamber relative to at least a first (123) and a second sensor (125) being installed on equal height in the coating chamber (100);

said device (120) being able to:

measure said variable via the lower sensor, and said at least first and second sensors separately; and compare the measured variables with each other, an advantageous process for coating mentioned substrates is achieved by the present invention. With the apparatus of the present invention it is possible to check whether the coating slurry already introduced into the coating chamber (100) is ready to be subjected to the attached monolith (121). In some instances it appears that the slurry is uneven or contains bubbles, as already mentioned (FIG. 2). If the coating process continues this would lead to disturbed coatings within the channels (110) of the monolith to be produced. For a coating process which runs only over part of the length of the monolith, in the essence this results in different zone lengths for different channels which in turn dramatically increases the risk of the coated monolith to be out of specification. This becomes even more pronounced if the coating speed and, therefore, the speed of introduction of the coating slurry into the coating chamber is further increased.

If, however, the surface of the coating slurry (130) pumped into the coating chamber shows an even appearance (FIG. 1) the process of coating leads to an even wetting of the monolith (121) by the coating slurry (113) and produces equal zone lengths (132) of the coating in the monolith channels (110). In that the apparatus of the present invention is able to detect and distinguish between even and uneven or disturbed surfaces of the coating slurry (130) within the coating chamber (100) just before the monolith is going to be coated, the coating process can be interrupted in time before a falsely coated monolith is produced and has to be destroyed afterwards or even leads to a rejection by the customer. Instead—if necessary—after emptying (118) a new filling (117) of the coating chamber (110) can be initiated through pipe (116) in beforehand and the monolith can now be coated advantageously if the apparatus shows an even coating slurry surface (130) within the coating chamber.

The measurement of the surface height of the coating slurry in the coating chamber (100) is made by sensors (123-125) which are connected to a central processing unit (140). While pumping in the coating slurry into the coating chamber (100) from below (116, 117) the slurry first reaches the sensor (124) on the lower end of the coating chamber (100) before—in the ideal case—sensors (123) and (125) simultaneously are contacted by the liquid slurry. Hence, the processing unit (140) detects the signals from both sensors within a certain but small time period. In order to check whether the surface of the slurry is even or not said at least first and second sensors preferably are positioned with maximum distance to each other around the coating chamber. This helps to maximize the possibility to really detect an even appearance of the coating slurry. In the case of more than two upper sensors, e.g. three or four sensors, alike first and second sensors the distribution of said sensors at a respective but same height in the coating chamber (100) is advantageously made along these lines. Therefore, three further sensors are positioned with an angle of 120° to each other around the coating chamber (100) and so forth. These further sensors are likewise connected to the processing unit (140).

At the time the slurry surface (130) reaches the sensors (123) and (125), and bridges these sensors with sensor (124), respectively, signals are sent to the processing unit (140) and the latter calculates whether the accuracy of the slurry surface (130) is within a threshold range. Certain values can be considered by the skilled worker that could be measured by the sensors (123-125). All sensors being possible for the skilled worker in this regard can be chosen (http://en.wikipedia.org/wiki/Level_sensor). In a preferred aspect the present invention uses electric variables in this regard which can be selected from the group consisting of current, capacity, and frequency. In the alternative vibrational sensors can be used, like a liquids level switch (http://www.vega.com/en/Level_switch_vibration.htm).

As depicted above the processing unit (140) decides whether the slurry surface (130) is accurate enough in order to continue the process of coating the monolith (121), The analysis of whether to continue or not is preferably made based on the signals sent from (123) and (125), respectively, and the time delay between both signals reaching the unit (140). Hence, it is advantageous that said device (120) gives notice if the delay between the measured variables is greater than a predefined value. This value greatly depends on the coating slurry used and the overall coating speed envisaged and is more preferably set to be below 1 sec, still more preferably below 0.5 sec and most preferably below 0.1 sec or even below 0.01 sec for usual coatings/slurries (see below).

The monoliths that could be taken for the present coating process or apparatus are known to the skilled worker. Preferably the substrate to be coated with the inventive apparatus is a so called wall-flow filter or a flow-through monolith. The substrates used here may be made of those materials typically used for preparing catalysts, and will preferably comprise a ceramic or metallic honeycomb structure. Suitable substrates may be employed, such as a monolithic substrate of the type having fine, parallel gas flow passages extending there through from an inlet or an outlet face of the substrate, such that passages are open to fluid flow there through (referred to as honeycomb flow-through substrates). The passages, which are essentially straight paths from their fluid inlet to their fluid outlet, are defined by walls on which or in which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 400-900 or more gas inlet openings (i.e., cells) per square inch of cross section (62-140 cells/cm$^2$).

The ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like. The substrates useful for the catalyst composite of the present invention may also be metallic in nature and be composed of one or more metals or metal alloys. The metallic substrates may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium, and/or aluminum, and the total amount of these metals may advantageously comprise at least about 15 wt % of the alloy, e.g., about 10-25 wt % of chromium, about 3-8 wt % of aluminum and up to about 20 wt % of nickel. The alloys may also contain small or trace amounts of one or more other metals such as manganese, copper, vanadium, titanium and the like. The surface of the metal substrates may be oxidized at high temperatures, e.g., about 1000° C. and higher, to improve the resistance to corrosion of the alloys by forming an oxide layer on the surfaces of the substrates. Such high temperature-induced oxidation may enhance the adherence of the refractory metal oxide support and catalytically promoting metal components to the substrate.

The substrate may also be a honeycomb wall-flow filter. Wall-flow substrates useful for supporting the coating compositions have a plurality of fine, substantially parallel gas flow passages extending along the longitudinal axis of the substrate. Typically, each passage is blocked at one end of the substrate body, with alternate passages blocked at opposite end-faces. Specific wall-flow substrates for use in the inventive apparatus include thin porous walled honeycombs (monoliths) through which the fluid stream passes without causing too great an increase in back pressure or pressure drop across the article. Normally, the presence of a clean wall-flow article will create a back pressure of 0.036 psi to 10 psi. These ceramic wall-flow substrates may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like. They are preferably formed of a material having a porosity of at least 40% (e.g., from 40 to 70%) having a mean pore size of at least 5 microns (e.g., from 5 to 30 microns). More preferably, the substrates have a porosity of at least 46% and have a mean pore size of at least 10 microns. When substrates with these porosities and these mean pore sizes are coated with the apparatus described above, adequate levels of the coating compositions can be loaded onto and/or into the pores of the substrates to achieve excellent pollutant conversion efficiency and burning off soot. These substrates are still able to retain adequate exhaust flow characteristics, i.e., acceptable back pressures, despite the catalyst loading. Suitable wall-flow substrates are for example disclosed in U.S. Pat. No. 4,329,162.

The expression "coating" is to be understood to mean the application of catalytically active materials and/or storage components on a substantially inert support body which may be constructed in the manner of an above-described wall-flow filter or flow-through monolith. The coating performs the actual catalytic function and contains storage materials and/or catalytically active metals which are usually deposited in highly disperse form on temperature-stable, large-surface-area metal oxides (see below). The coating is carried out usually by means of the application of an aqueous suspension of the storage materials and/or catalytically active components—also referred to as a washcoat—onto and/or into the wall of the inert support body. After the application of the suspension, the support is dried and if appropriate calcined at elevated temperature. The coating may be composed of one layer or constructed from a plurality of layers which are applied to a support body one above the other (in multi-layer form) and/or offset with respect to one another (in zones).

The liquid coating medium (113) is, for example, a suspension or dispersion for coating exhaust gas catalysts for motor vehicles ("washcoat") which contains catalytically active components or precursors thereof and inorganic oxides such as aluminum oxide, titanium dioxide, zirconium oxide or a combination thereof, it being possible for the oxides to be doped with silicon or lanthanum, for example. Oxides of vanadium, chromium, manganese, iron, cobalt, copper, zinc, nickel or rare earth metals such as lanthanum, cerium, praseodymium, neodymium, promethium, samarium, europium, gadolinium, terbium, dysprosium, holmium, erbium, thulium, ytterbium or combinations thereof can be used as catalytically active components. Noble metals such as platinum, palladium, gold, rhodium, iridium, osmium, ruthenium and combinations thereof can also be used as catalytically active components. These metals can also be present as alloys with one another or with other metals or as oxides. The metals can also be present as precursors, such as nitrates, sulfites or organyls of said noble metals and mixtures thereof, and, in particular, palladium nitrate, palladium sulfite, platinum nitrate, platinum sulfite or $Pt(NH_3)_4(NO_3)_2$ can be used in the liquid coating medium. By calcination at about 400° C. to about 700° C., the catalytically active component can then be obtained from the precursor. To coat a substrate for the production of automotive exhaust gas catalysts, a suspension or dispersion of an inorganic oxide can initially be used for coating, after which, in a subsequent coating step, a suspension or dispersion which contains one or more catalytically active components can be applied. However, it is also possible for the liquid coating medium to contain both these components. The liquid coating medium (slurry) often has a solids content of between 35 and 52% and a viscosity of between 15 and 300 cps.

In a further embodiment of the present invention the use of the inventive apparatus for coating substrates for the production of exhaust gas purification catalysts, particularly for motor vehicles, is claimed.

Said coating method is comprising the steps of:
subjecting a cylindrical support body (121) having two end faces, a circumferential surface and an axial length L, said support being traversed from the first end face to the second end face by a multiplicity of channels, to an inventive apparatus (122) from the top;
attaching said support body (121) to said apparatus (122) in a liquid tight manner;
pumping coating slurry (113) into the coating chamber (100) from below while measuring a variable via the sensors (123, 124, 125);
signaling if conditions for further processing the coating operation are or are not met.

It is needless to mention that all preferred and advantageous aspects mentioned for the apparatus of the invention are likewise preferred and advantageous also for its usage.

The coating process usually starts in that a certain coating slurry is pumped through pipe (116) into the coating chamber (100) until the sensors (123) and (125) signal that the correct coating height is reached within the chamber (100). In the meantime a substrate (121) is placed on the coating chamber (100) from above and tightly fixed as described e.g. in DE102010007499A1, DE 102010008700A1 or Chinese utility model 201420126144.7. These publications are advantageously also part of this disclosure with respect of how the coating process with the inventive apparatus can preferably be executed.

If being appropriately filled into the chamber (100) in the next step the coating slurry (130) is pumped further into the substrate (121) until the desired coating height (132) is reached. Subsequently, surplus coating slurry is drawn off from the substrate (121), and the substrate may be coated again with the same washcoat or is released from the coating chamber and processed further, e.g. coated again from the other direction or even a second time with a different washcoat from the same direction, or progressed to the weighing, drying or calcining unit.

DETAILED DESCRIPTION OF THE DRAWINGS

Figure 1:
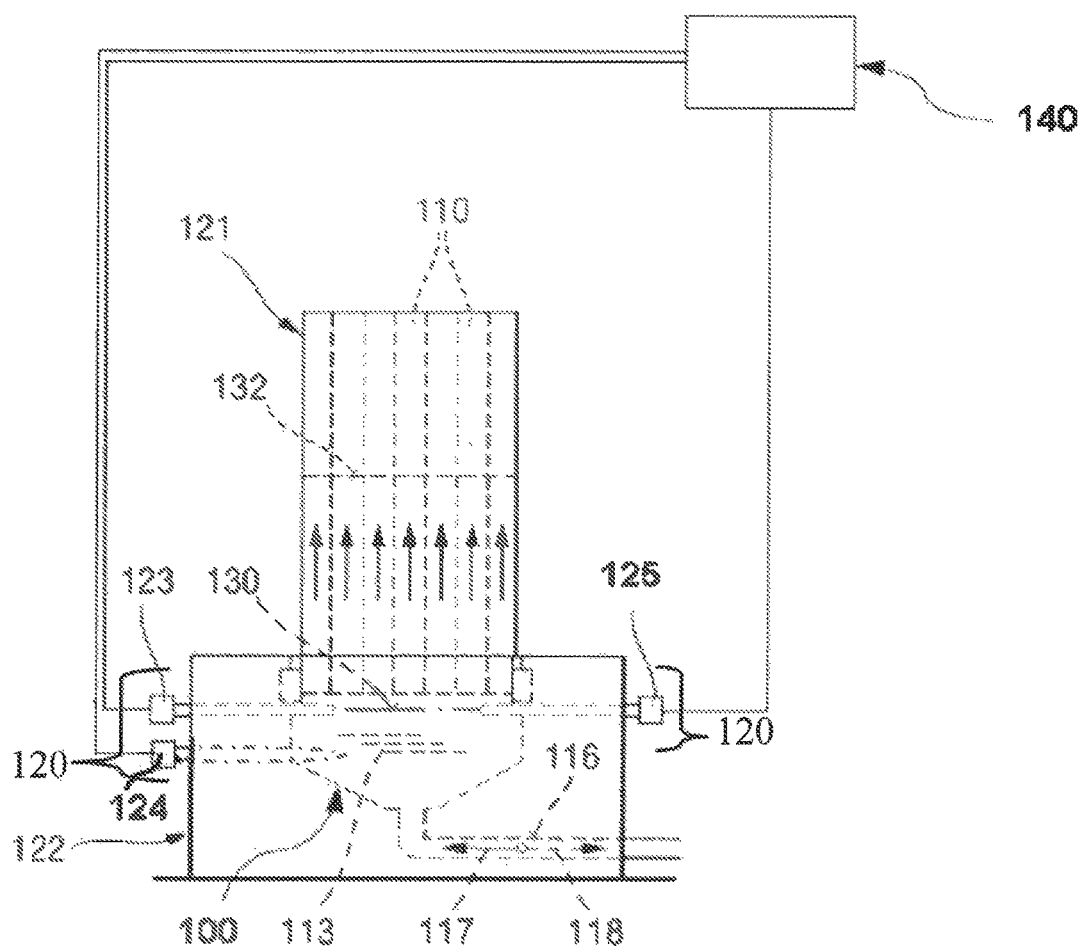
FIG. 1/

FIG. 1 shows an arrangement of the invention for coating channels (110) in a substrate (121). The liquid coating medium (113) is filled through line sections (116) into the coating apparatus (122), wherein the coating apparatus (122)

is provided with the substrate (121) and with sensors (123, 124 125) for determining the first level (130) and its accuracy. The values determined by the sensors (via 123 and 124 and via 123 and 125) are transmitted to a control unit (140) which, for its part, controls at least the further pumping or suction of the coating slurry based on the above-mentioned analysis.

After the filling of the coating apparatus (122) with coating medium (113) up to the first level (130) in the filling flow direction (117) has been performed, and after the second level (132) in the substrate (121) is reached, the coating slurry can be sucked out in the return flow direction (118), leading to a storage tank for excess coating medium (113) and for holding it ready for further use. All the control commands required for this purpose are preferably likewise output by the central control unit (140).

The finished substrates, which are suitable for the production of exhaust gas filters for motor vehicles, have a particularly uniform coating height, which is characterized in that the coated lengths of the different channels differ from one another by no more than 5 mm, in particular 3 mm, this applying to at least 95% of all the channels of a substrate, advantageously at least 99% of all the channels of a substrate, in particular 100% of all the channels. Defects of the substrate itself may mean that the flow and pressure conditions in some channels differ greatly from the other channels, the effect being that the liquid coating medium penetrates with considerably more or considerably less difficulty and is deposited either over a shorter or longer length of the individual channels under the coating conditions. In these cases, the desired uniform coating length may be achieved only in the case of some of the channels, but this is generally more than 95% of all the channels.

The present invention achieves this result in a very easy but nevertheless surprisingly effective manner. In that more sensors are located in the coating chamber in an intelligent way it is possible not only to measure the level of the coating slurry directly in the coating chamber but one may also determine whether the coating slurry is in a proper shape for further processing or not. This greatly helps to shorten the cycle time (time needed to coat one body) but on the other hand also serves to have less coated monoliths falling out of specification. Hence, this invention allows to greatly improve the economy of a process for coating exhaust catalysts. This was not made obvious from the prior art teaching at the date of this invention.

Figure 2:
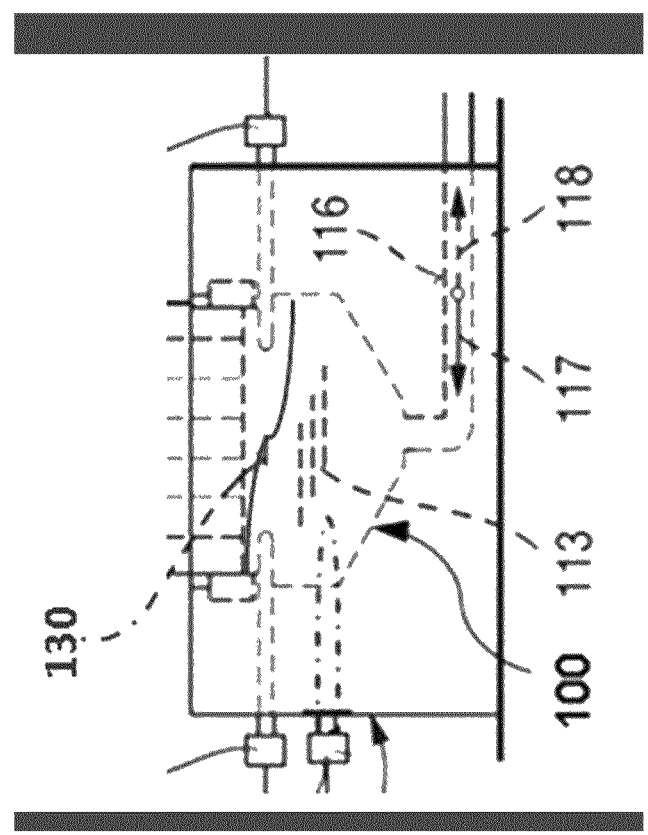
FIG. 2:
100 coating chamber
110 channels—in the substrate 121
113 coating slurry
116 line section
117 filling flow direction
118 return flow direction to remove coating medium 113
120 device for detecting the level 130
121 substrate
122 coating apparatus
123 first sensor for detecting the level 130
124 lower sensor for detecting the level 130
125 second sensor for detecting the level 130
130 first level—of 113 in the coating device 122
132 second level—of 113 in the substrate 121
140 control unit

FIG. 2 is a zoomed view in FIG. 1 showing an uneven distribution of the washcoat surface (130) in the coating chamber (100).

The invention claimed is:

1. An apparatus for coating substrates with a liquid coating slurry, the apparatus comprising:
    a coating chamber configured to receive a substrate at a top side and to attach the substrate in a liquid tight manner to the coating chamber and to receive a liquid coating slurry from below the top side;
    the coating chamber comprising a device to check the height of the liquid coating slurry within the coating chamber by measuring a variable;
    the device comprising at least a first sensor and a second sensor that are positioned at equal height to one another in the coating chamber, and a lower sensor that is positioned at a height in the coating chamber that is lower than the height of the first and second sensors;
    the device being operable to:
        make a first measurement of the variable via the lower sensor and the first sensor, and make a second measurement of the variable via the lower sensor and the second sensor; and
        compare the first measurement of the variable with the second measurement of the variable.

2. The apparatus according to claim 1, wherein the first and second sensors are positioned at a maximum distance from one another around the coating chamber.

3. The apparatus according to claim 1, wherein the variable is an electric variable selected from the group consisting of current, capacity, and frequency.

4. The apparatus according to claim 1, wherein the device is operable to give notice if a difference between the first and second measurements of the variable is below a predefined value.

5. The apparatus according to claim 1, wherein the apparatus is operable to receive and coat a substrate that is a wall-flow filter or a flow-through monolith.

6. A method for coating substrates for the production of exhaust gas purification catalysts, the method comprising:
    attaching a substrate to the apparatus of claim 1, at the top side of the coating chamber, in a liquid tight manner;
    pumping liquid coating slurry into the coating chamber from below the top side of the coating chamber while measuring a variable via the lower sensor and the first and second sensors;
    outputting a signal indicating whether conditions for coating the substrate are or are not met.

7. The apparatus according to claim 2, wherein the device is operable to give notice if a difference between the first and second measurements of the variable is below a predefined value.

8. The apparatus according to claim 3, the device is operable to give notice if a difference between the first and second measurements of the variable is below a predefined value.

9. The apparatus according to claim 4, wherein the device is operable, in making the first and second measurements of the variable, to:
    transmit a first signal to a processing unit upon determining that the lower sensor and the first sensor are simultaneously in contact with the liquid coating slurry; and
    transmit a second signal to the processing unit upon determining that the lower sensor and the second sensor are simultaneously in contact with the liquid coating slurry.

10. The apparatus according to claim 9, wherein the device is operable, in comparing the first measurement of the variable with the second measurement of the variable, to:
    determine a delay between reception of the first signal at the processing unit and reception of the second signal at the processing unit as the difference between the first and second measurements of the variable; and
    compare the delay to a predefined time value to judge if notice should be given.

11. The apparatus according to claim 7, wherein the device is operable, in making the first and second measurements of the variable, to:
    transmit a first signal to a processing unit upon determining that the lower sensor and the first sensor are simultaneously in contact with the liquid coating slurry; and transmit a second signal to the processing unit upon determining that the lower sensor and the second sensor are simultaneously in contact with the liquid coating slurry.

12. The apparatus according to claim 11, wherein the device is operable, in comparing the first measurement of the variable with the second measurement of the variable, to:

determine a delay between reception of the first signal at the processing unit and reception of the second signal at the processing unit as the difference between the first and second measurements of the variable; and compare the delay to a predefined time value to judge if notice should be given.

13. The apparatus according to claim 8, wherein the device is operable, in making the first and second measurements of the variable, to:

transmit a first signal to a processing unit upon determining that the lower sensor and the first sensor are simultaneously in contact with the liquid coating slurry; and transmit a second signal to the processing unit upon determining that the lower sensor and the second sensor are simultaneously in contact with the liquid coating slurry.

14. The apparatus according to claim 13, wherein the device is operable, in comparing the first measurement of the variable with the second measurement of the variable, to:

determine a delay between reception of the first signal at the processing unit and reception of the second signal at the processing unit as the difference between the first and second measurements of the variable; and compare the delay to a predefined time value to judge if notice should be given.

* * * * *